United States Patent
Fielding

(10) Patent No.: US 7,245,783 B2
(45) Date of Patent: Jul. 17, 2007

(54) SYSTEM AND METHOD FOR ESTIMATING, SYNTHESIZING AND MATCHING NOISE IN DIGITAL IMAGES AND IMAGE SEQUENCES

(75) Inventor: Gabriel Fielding, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 848 days.

(21) Appl. No.: 10/602,427

(22) Filed: Jun. 24, 2003

(65) Prior Publication Data

US 2004/0264795 A1    Dec. 30, 2004

(51) Int. Cl.
G06K 9/40 (2006.01)
H04N 5/00 (2006.01)

(52) U.S. Cl. .................. 382/275; 348/578; 348/607; 345/632

(58) Field of Classification Search ................ 382/275; 348/578, 607–624; 345/632
See application file for complete search history.

(56) References Cited

U.S. PATENT DOCUMENTS

| | | | |
|---|---|---|---|
| 5,600,731 A | 2/1997 | Sezan et al. | 382/107 |
| 5,641,596 A | 6/1997 | Gray et al. | 430/21 |
| 6,441,867 B1 * | 8/2002 | Daly | 348/607 |
| 6,587,509 B1 * | 7/2003 | Suzuki et al. | 375/240.29 |
| 6,593,933 B1 * | 7/2003 | Xu et al. | 345/586 |
| 6,724,437 B2 * | 4/2004 | Funke et al. | 348/622 |
| 6,995,793 B1 * | 2/2006 | Albadawi et al. | 348/239 |
| 2002/0034337 A1 | 3/2002 | Shekter | 382/275 |
| 2002/0171660 A1 * | 11/2002 | Luo et al. | 345/582 |

OTHER PUBLICATIONS

"Pyramid-Based Texture Analysis/Synthesis" by Bergen and Heeger. SIGGRAPH, 1995, pp. 229-238.

"Texture synthesis using 2-d noncausal autoregressive models" by Chellappa and Kashyap. IEEE Trans. on Acoustics, Speech, and Signal Processing, vol. 33, pp. 194-203, Feb. 1985.

"Texture synthesis by non-parametric sampling" by Efros and T. Leung, ICCV99, pp. 1033-1038, 1999.

"Estimation of Noise in Images: An Evaluation" by Olsen, GMIP(55), No. 4,Jul. 1993, pp. 319-323.

"Fast Noise Variance-Estimation" by Immerkaer. Computer Vision Image Understanding (64), No. 2, Sep. 1996, pp. 300-302.

"Noise Reduction in Image Sequences Using Motion-Compensated Temporal Filtering" by E. Dubois and S. Sabri. IEEE Trans. Communications(32), 1984, pp. 826-831.

"The Robust Estimation of Multiple Motions" Parametric and Piecewise-Smooth Flow-Fields by M.J. Black and P. Anandan. Computer Vision and Image Understanding, Jan. 1996.

* cited by examiner

*Primary Examiner*—Bhavesh M Mehta
*Assistant Examiner*—Aaron Carter
(74) *Attorney, Agent, or Firm*—Robert Luke Walker

(57) ABSTRACT

A method for synthesizing noise in a digital image comprises the steps of (a) estimating noise statistics based on a set of spatial autocorrelation coefficients and a set of spectral correlation coefficients that correspond to the color channels of the image, where at least one of the spatial autocorrelation coefficients is weighted by at least one of the spectral correlation coefficients, thereby providing a weighted set of autocorrelation coefficients, and where a set of filter coefficients is obtained from the weighted set of autocorrelation coefficients; and (b) synthesizing a synthetic texture by using the filter coefficients to filter a random noise field in each of the color channels, thereby producing output noise fields in each of the color channels that replicate a synthetic texture, e.g., a desired grain appearance, when combined into the digital image.

11 Claims, 7 Drawing Sheets

US 7,245,783 B2

SYSTEM AND METHOD FOR ESTIMATING, SYNTHESIZING AND MATCHING NOISE IN DIGITAL IMAGES AND IMAGE SEQUENCES

FIELD OF THE INVENTION

The invention relates generally to the field of digital image processing and in particular to digital synthesis and matching of noise.

BACKGROUND OF THE INVENTION

It is generally known that compositing computer graphics and film imagery requires that the computer graphics elements be matched in terms of color and texture to the underlying background elements. Typically these background elements have been captured on film. It is also known that intercutting footage from different sources such as two kinds of film, or film and digital video, requires that the different elements match to create a seamless look for the entire image sequence. With more footage from mixed sources and computer graphics, there is a clear need for a robust grain simulation model. Moreover, there is a need for a fully automatic method of estimating grain parameters in image sequences to reduce the need for user interaction, which can be quite time consuming.

Grain in digitized film images is well characterized by zero-mean Gaussian distributed noise for the three color channels. Zero-mean Gaussian models are fully characterized by their second-order statistics (the auto-covariance function). Modelling the interactions between color channels requires analysis of the spectral correlations. These spectral and spatial correlations can then be used to shape a white noise signal to create synthetic grain. In this way, synthesis of a simulated grain pattern is essentially a texture synthesis problem. But correct shaping of the white noise is required to generate a visually indistinguishable "match" for a given film grain.

Texture analysis/synthesis methods are well known in the literature. Bergen and Heeger ("Pyramid-Based Texture Analysis/Synthesis" SIGGRAPH, 1995, pp. 229-238) describe a method for analyzing a texture pattern and then replicating it. This method suffers from improper color correlation techniques generating significant bias in different color channels. The problem lies with the simple fact that once white noise fields have been convolved, the autocorrelation function (ACF) is non-zero for each color channel. Adding these together using a color transformation generates the correct spectral correlations but biases the spatial correlations. Biased spatial correlations will result in synthesized textures that look different from the desired texture.

Chellappa and Kashyap considered autoregressive models for texture synthesis ("Texture synthesis using 2-d noncausal autoregressive models," *IEEE Trans. on Acoustics, Speech, and Signal Processing*, vol. 33, pp. 194-203, February 1985) but the optimization methods required in that work are inefficient (i.e., long processing times for both analysis and synthesis).

The newer area of non-parametric synthesis requires templates of grain to perform the synthesis and is also known to be more computationally intensive than other methods. For example, Efros and T. Leung, ("Texture synthesis by non-parametric sampling," in *ICCV99*, pp. 1033-1038, 1999) considered how to sample pattern templates to generate new versions of the pattern. This is time consuming and cannot produce a wide enough variety of patterns when considering signal dependent noise.

With regard to noise estimation, most methods use single frames. Consider, for example, Olsen ("Estimation of Noise in Images: An Evaluation," *GMIP*(55), No. 4, Jul. 1993, pp. 319-323) and Immerkaer, ("Fast Noise Variance-Estimation", *Computer Vision Image Understanding*(64), No. 2, September 1996, pp. 300-302). These two methods estimate noise in generally flat regions of a single image. Motion compensated noise reduction methods are also known in the literature (see for example Dubois, E., Sabri, S., "Noise Reduction in Image Sequences Using Motion-Compensated Temporal Filtering," *IEEE Trans. Communications* (32), 1984, pp. 826-831). Although these methods are used for image sequences, they ignore the concept of iteratively estimating both motion and noise parameters.

There are also relevant patents in the prior art. Published U.S. patent application Ser. No. 2002/0034337 (entitled "System for Manipulating Noise in Digital images") discloses a method for shaping white noise to create synthetic noise with specific characteristics. The most obvious problem with this approach is the assumption that the color channels can simply be decorrelated and the noise synthesized independently. The subband decomposition procedure disclosed therein follows closely the treatment by Bergen and Heeger mentioned above. Indeed, it suffers from exactly the same improper color correlation techniques, thereby generating significant bias in different color channels.

In commonly-assigned U.S. Pat. No. 5,641,596 (which issued Jun. 24, 1997 and is entitled "Adjusting Film grain properties in digital images" and), D. Cok and R. Gray disclose a method for synthesizing film grain using an autoregressive model that yields very good results. To achieve a better match to older or unknown film stocks, a larger spatial support is necessary. The model in that work had a limited spatial support and as scanning resolutions increase, spatial support needs to grow accordingly.

The prior art disclosed above is deficient in its ability to efficiently generate a visually indistinguishable "match" for a given film grain. What is needed is a method of synthesizing noise that visually approximates a given film grain and is also close in a numerical sense to the statistics in a given random field. In particular, it would be desirable to perform grain matching when given the statistics for two different images. Finally, it would be desirable to have a robust method for automatically determining those statistics for image sequences.

SUMMARY OF THE INVENTION

The present invention is directed to overcoming one or more of the problems set forth above. Briefly summarized, according to one aspect of the present invention, the invention resides in a method and system for synthesizing noise in a digital image comprised of a plurality of color channels, where the noise is used to represent a synthetic texture that visually approximates a predetermined appearance. More specifically, the method comprises the steps of (a) estimating noise statistics based on a set of spatial autocorrelation coefficients and a set of spectral correlation coefficients that correspond to the color channels, where at least one of the spatial autocorrelation coefficients is weighted by at least one of the spectral correlation coefficients, thereby providing a weighted set of autocorrelation coefficients, and where filter coefficients are obtained from the weighted set of autocorrelation coefficients; and (b) synthesizing a synthetic texture by using the filter coefficients to filter a random noise field in each of the color channels, thereby producing output noise fields in each of the color channels that replicate the synthetic texture when combined into the digital image.

Accordingly, we disclose a method for synthesizing a texture when given second order noise statistics and spectral correlations. This data may be obtained from scanned film samples, from any digital image sequence, or may be interactively user controlled. We also disclose a method for matching noise between two different images using second order noise statistics and spectral correlations. Finally, we disclose a method for automatically computing required noise statistics in image sequences with or without test target data thus facilitating fully automatic robust noise matching.

The principal advantage of the present invention is that it improves upon prior art by producing very high quality textures that resemble grain from film images.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because digital processing systems employing noise estimation, synthesizing and matching are well known, the present description will be directed in particular to attributes forming part of, or cooperating more directly with a system and method in accordance with the present invention. System and method attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the system and method as described according to the invention in the following materials, software not specifically shown, suggested or described herein that is useful for implementation of the invention is conventional and within the ordinary skill in such arts. If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

The present invention improves upon prior art by producing very high quality textures that resemble grain from film images. Moreover, a technique for estimating the statistics from an arbitrary sequence is shown and a technique for matching the noise levels from two different sequences is given.

Figure 1:
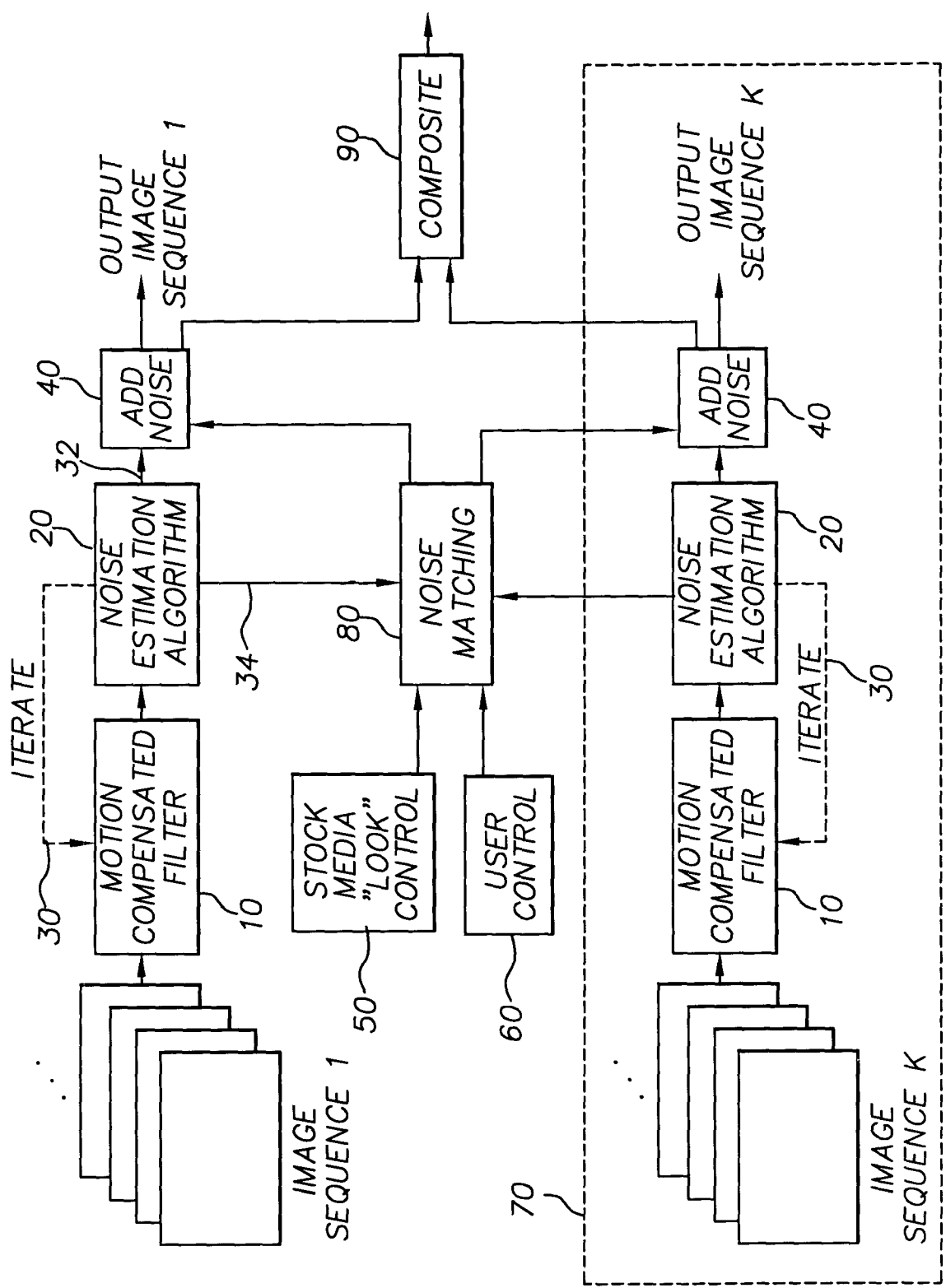
FIG. 1 is a block diagram illustrating the overall workflow for the method and system according to the invention.

FIG. 1 shows the overall system and workflow for the invention as disclosed herein either for estimating the statistics from an arbitrary source or sequence (e.g., image sequence 1) or for matching the noise levels from two (or more) different sequences (e.g., image sequences 1 . . . K). In FIG. 1, an image sequence 1 is shown having its noise reduced by a motion compensated filter 10 followed by a noise estimation algorithm 20. That process may be performed once or may be repeated iteratively (30). At this point the image sequence on a line 32 has had its noise reduced and a good estimate on a line 34 of both the original and remaining noise is available. The image sequence may then have noise added back to it in an adder stage 40 in order, e.g., to visually approximate a desired appearance, such as the appearance of a given film grain.

The characteristics of the noise that get added back may be determined in several ways from an arbitrary source or from one or more image sequences. First, the noise may be chosen from predetermined media "looks" or appearances 50 which will make the current sequence look, e.g., in terms of a given film grain, as though it originated on another media. This may be done by analyzing a given media or by having an artist design a particular look and then storing the parameters for that look. In this way, infinitely many media "looks" are possible. Alternatively, the noise may be manually controlled by a user in an interactive control system 60. Finally, the noise may be determined from the analysis of the noise estimate returned on line 34 from image sequence 1 or from an analysis (in an image sequence analysis stage 70) of one or more other digital image sequences (e.g., the image sequence K). Any of these controls (50, 60, 70) can be used to set the "target" look.

The noise matching block 80 performs the filter coefficient generation and the noise synthesis that determines the characteristics of the noise that needs to be added to the sequence or sequences in the adders 40, thereby forming an output image sequence 1 (and/or an output image sequence K) and/or a composite image sequence output 90. (In FIG. 1, the additional "target" image sequence is shown as an image sequence K, which may be for example a sequence shot against a green screen that will be composited with the current image sequence 1. The stage 70 for the image sequence K includes similar components 10, 20, 30 and 40 for estimating and adding noise to its output image sequence K and/or to the composite image sequence output 90.)

Signal dependent noise that very closely resembles film grain can be generated using the following model for generating noise:

$$r(x,y) = \alpha_r \tilde{r}(x,y)$$

$$g(x,y) = \alpha_g \tilde{g}(x,y) + \beta_g r(x,y)$$

$$b(x,y) = \alpha_b \tilde{b}(x,y) + \beta_b g(x,y) \quad \text{Eq. (1)}$$

Figure 2:
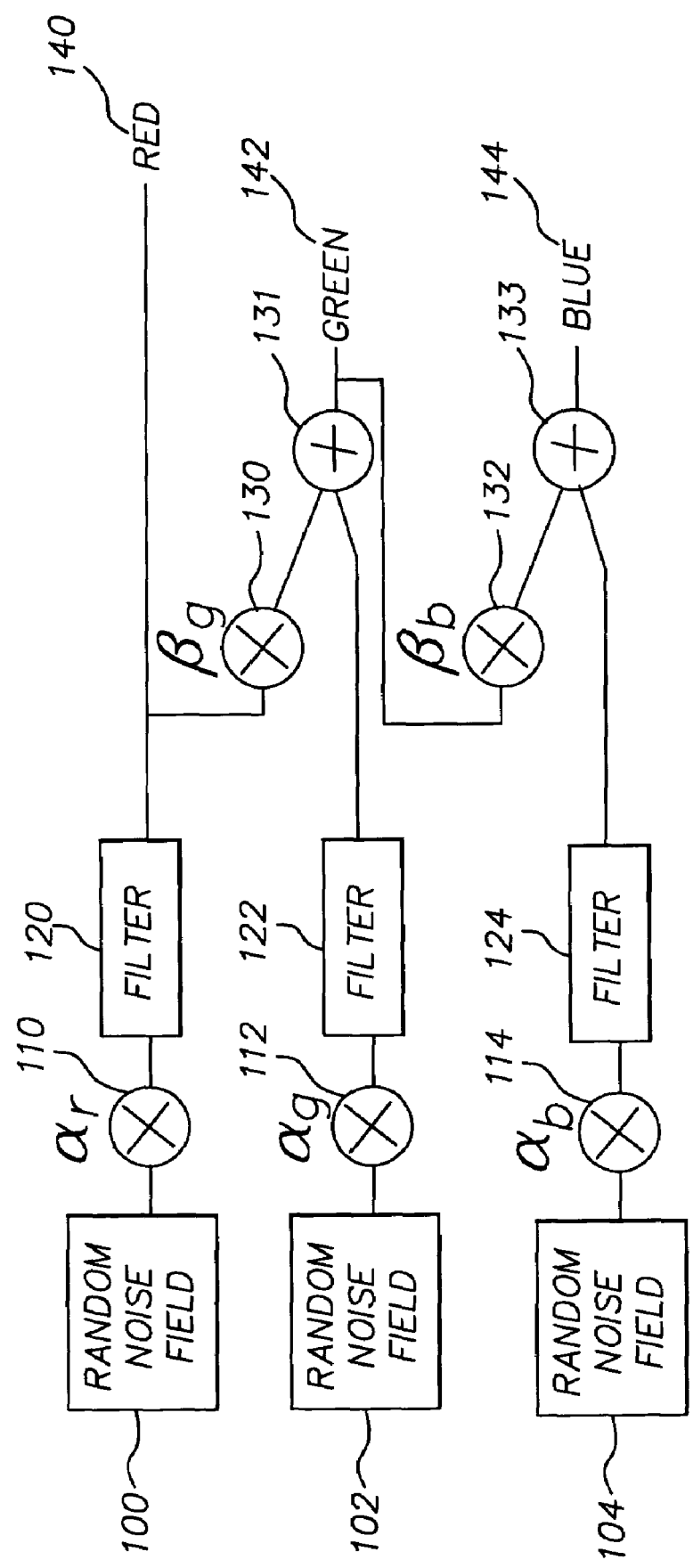
FIG. 2 is a block diagram illustrating a noise synthesis technique by which signal dependent noise is generated.

This model is illustrated in FIG. 2 for a plurality of random noise fields in a plurality of color channels. In that figure, a random noise field 100 for the red channel is multiplied in a multiplier 110 by a scale factor $\alpha_r$ and filtered in a filter 120 to produce a scaled output noise field $\alpha_r \tilde{r}$ (140). Similarly, a random noise field 102 for the green channel is multiplied in a multiplier 112 by a scale factor $\alpha_g$ and filtered in a filter 122 to produce an intermediate noise field $\alpha_g \tilde{g}$. This is added (adder 131) to a portion $\beta_g$ of the red noise field 140, produced by a scaling multiplier 130, to generate a green noise field 142. Finally, a random noise field 104 for the blue channel is multiplied in a multiplier 114 by a scale factor $\alpha_b$ and filtered in a filter 124 to produce an intermediate noise field $\alpha_b \tilde{b}$. This is added (adder 133) to a portion $\beta_b$ of the green noise field 142, produced by a scaling multiplier 132, to generate a blue noise field 144. The random noise fields 100, 102, 104 are typically Gaussian random noise fields whose individual elements are scaled using a noise table describing the variance at a given code value, i.e., at one or more signal levels. This noise table maps code values to variances or standard deviations, where the variances or standard deviations may be a function of the image data. Film grain is signal dependent so the underlying image content is needed to provide appropriate scaling factors (in this work we assume this scaling is done prior to scaling by the scale factors $\alpha_r$, $\alpha_g$, and $\alpha_b$.) It should be obvious to those skilled in the art that various combinations of the different channels may be added to yield a correlated color signal.

Figure 3:
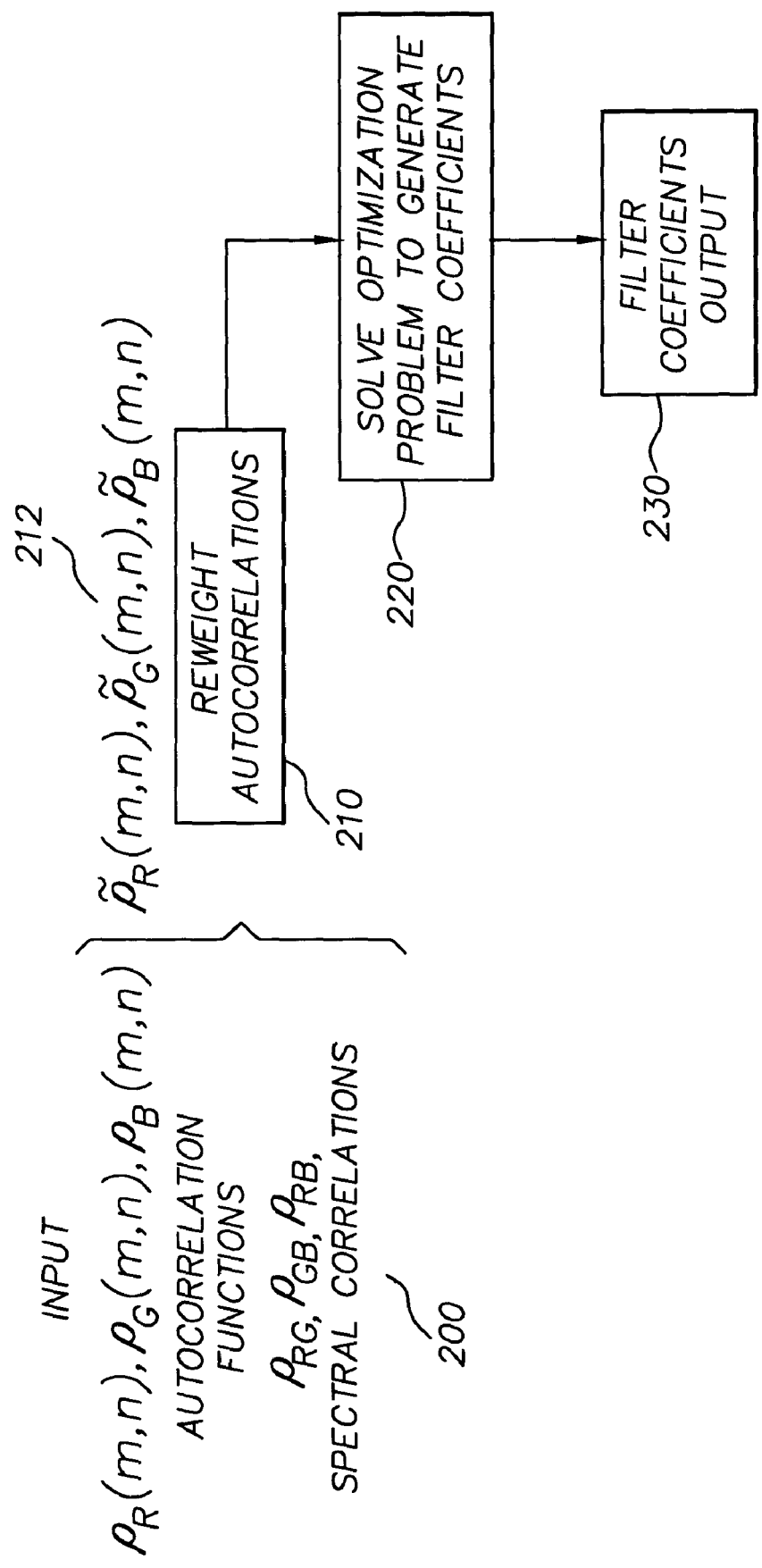
FIG. 3 is a diagram illustrating a technique of filter coefficient generation by which target spatial autocorrelation parameters are modified by the spectral correlation coefficients to produce modified autocorrelation functions which are subsequently used to solve for the filter coefficients.

Making noise appear as a predetermined texture, such as film grain requires that the filtering blocks 120, 122 and 124 shown in FIG. 2 produce correct target autocorrelation values and variances. In one aspect of the invention, a predetermined texture is synthesized when given a selected set of spatial autocorrelation coefficients $\rho_R(N)$, $\rho_G(N)$, $\rho_B(N)$ and a selected set of spectral correlation coefficients $\rho_{RG}$, $\rho_{GB}$, $\rho_{RB}$. This coefficient data may be obtained from conventional sources, such as a calculation from scanned film samples or from any digital image sequence, or from interactive user control. Based on this coefficient data, it can be shown that the following relations will yield the correct noise statistics in the output noise fields 140, 142 and 144:

$$\alpha_r = \alpha_g = \alpha_b = 1 \quad \text{Eqs. (2)}$$

$$\sigma_{\tilde{r}} = \sigma_r$$

$$\sigma_{\tilde{g}} = \sigma_g \sqrt{1 - \rho_{rg}^2}$$

$$\beta_g = \rho_{rg} \frac{\sigma_g}{\sigma_r}$$

$$\sigma_{\tilde{b}} = \sigma_b \sqrt{1 - \rho_{gb}^2}$$

$$\beta_b = \rho_{gb} \frac{\sigma_b}{\sigma_g}$$

and,

-continued $$\rho_{\tilde{r}}(N) = \rho_r(N) \quad \text{Eqs. (3)}$$

$$\rho_{\tilde{g}}(N) = \frac{\rho_g(N) - \rho_{rg}^2 \rho_r(N)}{1 - \rho_{rg}^2}$$

$$\rho_{\tilde{b}}(N) = \frac{\rho_b(N) - \rho_{gb}^2 \rho_g(N)}{1 - \rho_{gb}^2}$$

where the notation x(N) indicates a correlation at lag N in one dimension. The equations are also valid when the lag is denoted x(m,n) where m and n denote a lag in the horizontal and vertical direction. This process of reweighting the autocorrelation coefficients is illustrated in FIG. 3 for a multi-channel source of noise data. FIG. 3 illustrates how the input autocorrelation functions and spectral correlations 200 are used in the reweighting stage 210 according to Eqs. (3) to produce modified autocorrelations 212. Eqs. (3) describes the target autocorrelation values that the filtered noise fields should have so the final noise fields appear as specified when added together. Eqs. (2) describes how to modify the variance (the sigma terms) of the noise fields prior to filtering as well as how to weight the fields when creating the final synthesized noise (as shown in FIG. 2). With the target autocorrelation values (the tilde values) one can build a filter by invoking an optimization algorithm 220 for solving an optimization problem. The optimization problem solves for the filter coefficients when given the autocorrelation values. The formulation of the optimization problem depends upon the form of the filter. Filter coefficients for autoregressive models can be solved using the Yule-Walker equations; however, we use a modified linear system to minimize errors in correlation terms at higher lags. As an illustration, for terms up to lag 4 we can solve the following equation in a least-squares sense:

$$\begin{bmatrix} 1 & \rho(1) & \rho(2) & \rho(3) \\ \rho(1) & 1 & \rho(1) & \rho(2) \\ \rho(2) & \rho(1) & 1 & \rho(1) \\ \rho(3) & \rho(2) & \rho(1) & 1 \\ \rho(4) & \rho(3) & \rho(2) & \rho(1) \\ 0 & \rho(4) & \rho(3) & \rho(2) \\ 0 & 0 & \rho(4) & \rho(3) \\ 0 & 0 & 0 & \rho(4) \end{bmatrix} \begin{bmatrix} \theta_1 \\ \theta_2 \\ \theta_3 \\ \theta_4 \end{bmatrix} = \begin{bmatrix} \rho(1) \\ \rho(2) \\ \rho(3) \\ \rho(4) \\ 0 \\ 0 \\ 0 \\ 0 \end{bmatrix} \quad \text{Eq. (4)}$$

The above steps are repeated for each color channel or band and for the horizontal and vertical image dimensions to build a separable filter. For autoregressive models the output is then obtained:

$$\hat{r}_0 = n_{r_0} + \sum_{i=1}^{p} \theta_i \hat{r}_i \qquad \tilde{r}_0 = \hat{r}_0 + \sum_{i=1}^{p} \hat{\theta}_i \hat{r}_i \quad \text{Eqs. (5)}$$

$$\hat{g}_0 = n_{g_0} + \sum_{i=1}^{p} \psi_i \hat{g}_i \qquad \tilde{g}_0 = \hat{g}_0 + \sum_{i=1}^{p} \hat{\psi}_i \tilde{g}_i$$

$$\hat{b}_0 = n_{b_0} + \sum_{i=1}^{p} \chi_i \hat{b}_i \qquad \tilde{b}_0 = \hat{b}_0 + \sum_{i=1}^{p} \hat{\chi}_i \tilde{b}_i$$

If a moving average filter is desired, the filter coefficients may be determined by solving a nonlinear equation. An example for a one-dimensional non-linear filter with five coefficients is as follows:

$$\min_{\theta_1,\theta_2,\theta_3,\theta_4} \left( \omega_1 \left( \rho_{\tilde{r},x}(1) - \frac{\theta_0\theta_1 + \theta_1\theta_2 + \theta_2\theta_3 + \theta_3\theta_4}{\theta_0^2 + \theta_1^2 + \theta_2^2 + \theta_3^2 + \theta_4^2} \right)^2 + \right.$$

$$\omega_2 \left( \rho_{\tilde{r},x}(2) - \frac{\theta_0\theta_2 + \theta_1\theta_3 + \theta_2\theta_4}{\theta_0^2 + \theta_1^2 + \theta_2^2 + \theta_3^2 + \theta_4^2} \right)^2 +$$

$$\omega_3 \left( \rho_{\tilde{r},x}(3) - \frac{\theta_0\theta_3 + \theta_1\theta_4}{\theta_0^2 + \theta_1^2 + \theta_2^2 + \theta_3^2 + \theta_4^2} \right)^2 +$$

$$\left. \omega_4 \left( \rho_{\tilde{r},x}(4) - \frac{\theta_0\theta_4}{\theta_0^2 + \theta_1^2 + \theta_2^2 + \theta_3^2 + \theta_4^2} \right)^2 \right)$$

Eq. (6)

Similarly, one may build a non-separable autoregressive or moving average model using the two dimensional autocorrelation values $\rho_R(m,n)$, $\rho_G(m,n)$, $\rho_B(m,n)$. These solutions are solved in a similar way to the methods disclosed above. Whatever the exact solution, the filter coefficients are clearly tied to the modified autocorrelation values. These filter coefficients are provided as the output 230 of the filter coefficient generation process, as shown in FIG. 3, and are then used as the filter coefficients for the filters 120, 122 and 124 in FIG. 2.

Figure 4:
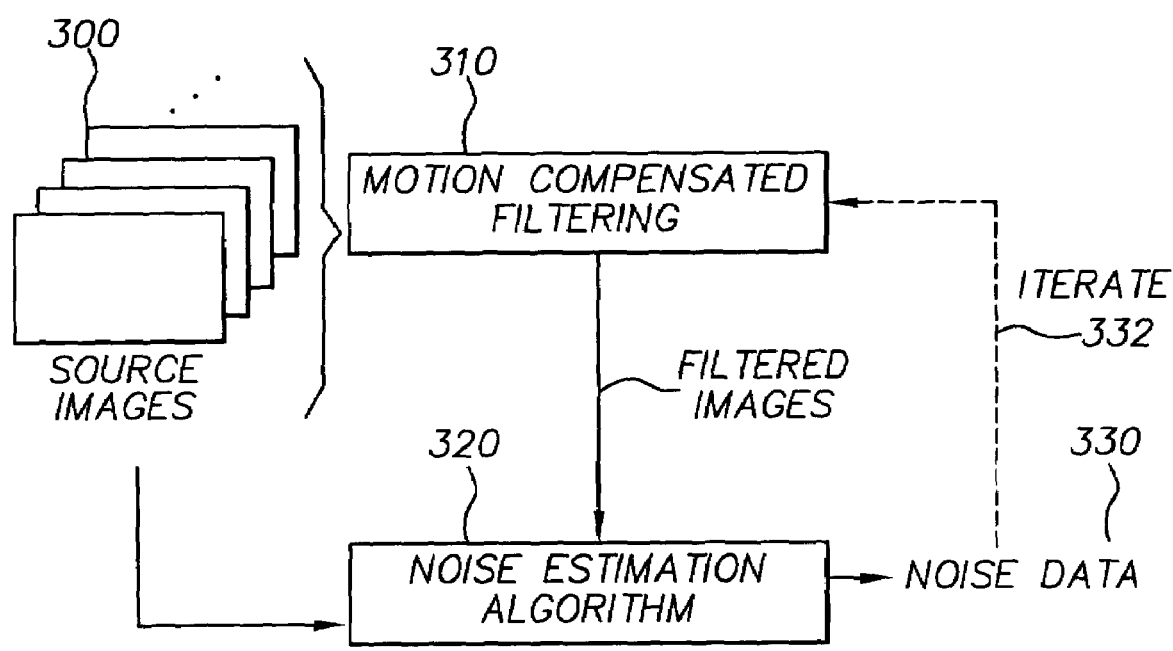
FIG. 4 is a block diagram illustrating a noise estimation technique by which signal dependent noise is estimated directly from image data, possibly utilizing an iterative step.

Sometimes the noise statistics of the source and target are known via a calibration procedure. More often than not, they are unknown and need to be estimated from data. Also, it should be clear that arbitrary noise matching is not always possible unless the source and target material are modified. Consider simply that one cannot add an uncorrelated random signal to the source material and end up with a lower noise position. If the target noise position is lower than the source position then some form of filtering is required. But noise filtering usually requires an estimate of signal noise which may be unknown. To accomplish noise estimation and filtering, FIG. 4 shows a means of iteratively performing signal dependent motion compensated noise filtering and noise estimation. In FIG. 4, a sequence of source images 300 is filtered by a filtering stage 310 and these filtered images are compared to the original images by a noise estimation algorithm 320 to produce an estimate of the noise 330. This process may be iterated as shown (332) where the new noise estimate is used in the motion estimation and filtering stage 310 to produce a better noise estimate.

A preferred motion estimation technique for use with the present invention is disclosed in Black, M. J. and Anandan, P., "The Robust Estimation of Multiple Motions: Parametric and Piecewise-Smooth Flow-Fields," *Computer Vision and Image Understanding*, January 1996, which is incorporated herein by reference. For the purposes of the present discussion a brief overview of the algorithm is given. Black et al. proposed the use of robust functions of the optical flow and smoothness terms in the general optical flow formulation. Their total energy function has the form:

$$E_t(u, v) = \lambda_f \rho_f(uI_x + vI_y + I_t, \sigma_f) + \sum_k \lambda_s \rho_s(u - u_k, \sigma_s) + \lambda_s \rho_s(v - v_k, \sigma_s).$$

Eq. (7)

The derivatives of the total energy function are:

$$\frac{\partial E_t}{\partial u} = \lambda_f I_x \varphi_f(uI_x + vI_y + I_t, \sigma_f) + \sum_k \lambda_s \varphi_s(u - u_k, \sigma_s) = 0$$

$$\frac{\partial E_t}{\partial v} = \lambda_f I_y \varphi_f(uI_x + vI_y + I_t, \sigma_f) + \sum_k \lambda_s \varphi_s(v - v_k, \sigma_s) = 0.$$

Eqs. (8)

In these equations ρ is the robust error norm and φ is the derivative of ρ. For example, in Black et al. one robust function used is the Lorentzian $$\rho(x, \sigma) = \log\left(1 + \frac{1}{2}\left(\frac{x}{\sigma}\right)^2\right) \text{ with } \varphi(x, \sigma) = \frac{2x}{2\sigma^2 + x^2}.$$

The selection of the scaling term σ in the above equations is varied according to the concept of graduated non-convexity, as described in the paper. However, in the present invention we propose tying the parameter to the signal dependent noise often found in scanned films. Doing this produces more robust motion estimates.

Given a set of motion estimates, one may apply motion compensated noise filtering techniques, which are known in the literature to those skilled in the art. One means is disclosed in commonly-assigned U.S. Pat. No. 5,600,731 (which issued Feb. 4, 1997 to M. Sezan, M. Ozkan, and S. Fogel, and is entitled "Method for Temporally Adaptive Filtering of Frames of a Noisy Image Sequence using Motion Estimation"), which is incorporated herein by reference. The filtered image is subtracted from the original image to produce a noise map and estimates of signal dependent variance and signal dependent autocorrelation parameters are computed using well-known statistical methods. These parameters may then be fed back into the motion estimator, as shown by an iteration operation 332 in FIG. 4, and used to re-compute the motion and filtered images. Such iteration produces more robust results.

Figure 5:
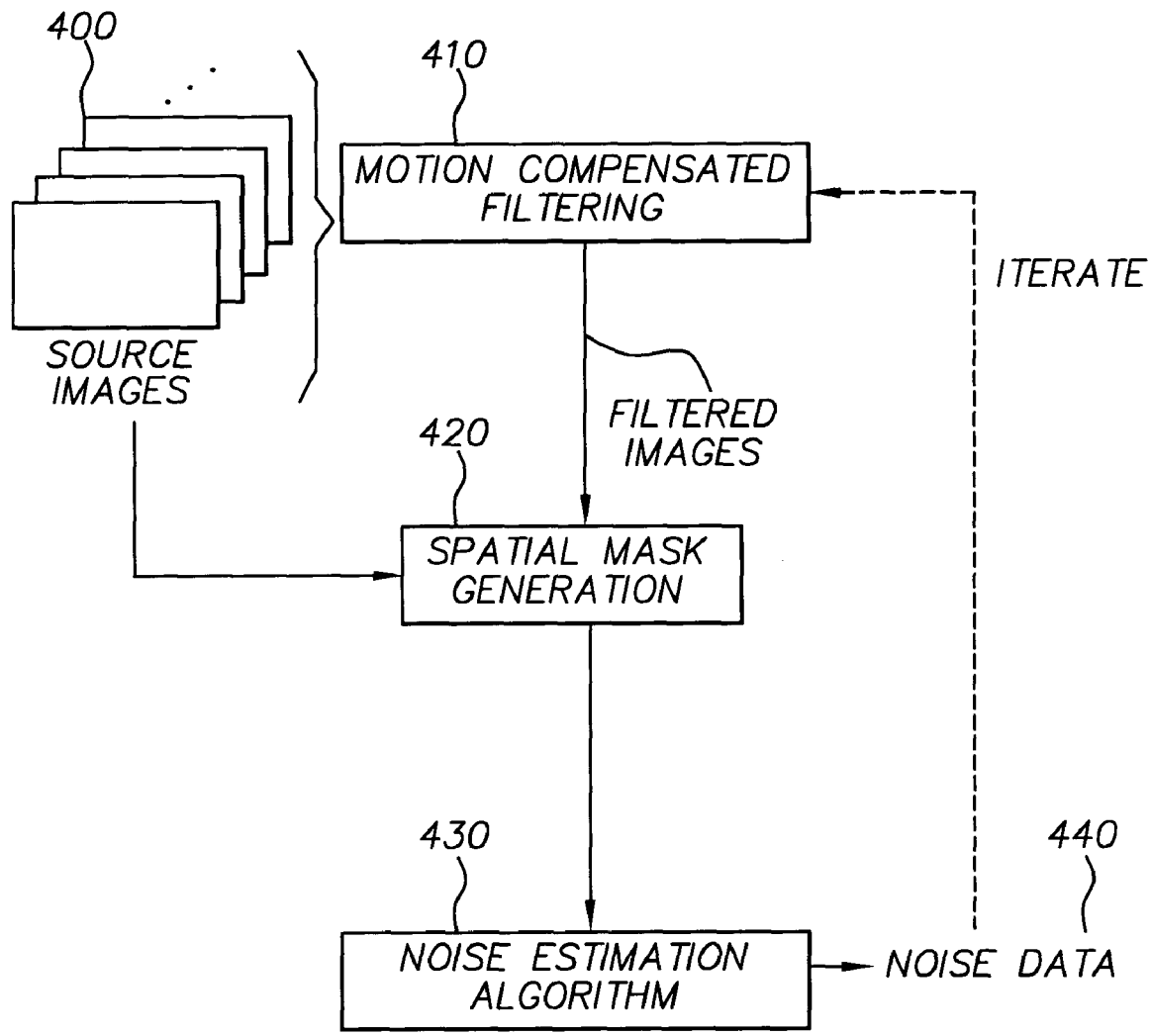
FIG. 5 is a block diagram illustrating a noise estimation technique by which signal dependent noise is estimated directly from image data, possibly utilizing an iterative step, with the additional step of estimating and using spatial masks to improve the robustness of the noise estimation.

Occasionally the filtering produces artifacts, and the difference between the filtered image and the noisy image contains more than a representation of the noise but also signal content. To avoid biasing the statistics of the noise estimate, we avoid regions with large errors by using information from the filtering algorithm and/or information from the image itself to generate a spatial mask that may be used to modify the statistical computation of noise estimates. This procedure is shown in FIG. 5. As before, the entire procedure may be iterated (432) to improve robustness. In FIG. 5, a sequence of source images 400 is filtered in a motion compensated filtering stage 410 and these filtered images are compared to the original images in a spatial mask generation stage 420. A spatial mask is generated in the stage 420 to determine where good regions are in the image to estimate noise. The filtered images, original images, and masks are used by a noise estimation algorithm 430 to produce an estimate of the noise 440. This process may be iterated (432) as shown where the new noise estimate is used in the motion estimation and filtering stage 410, which produces more reliable masks and hence better noise estimate.

Figure 6:
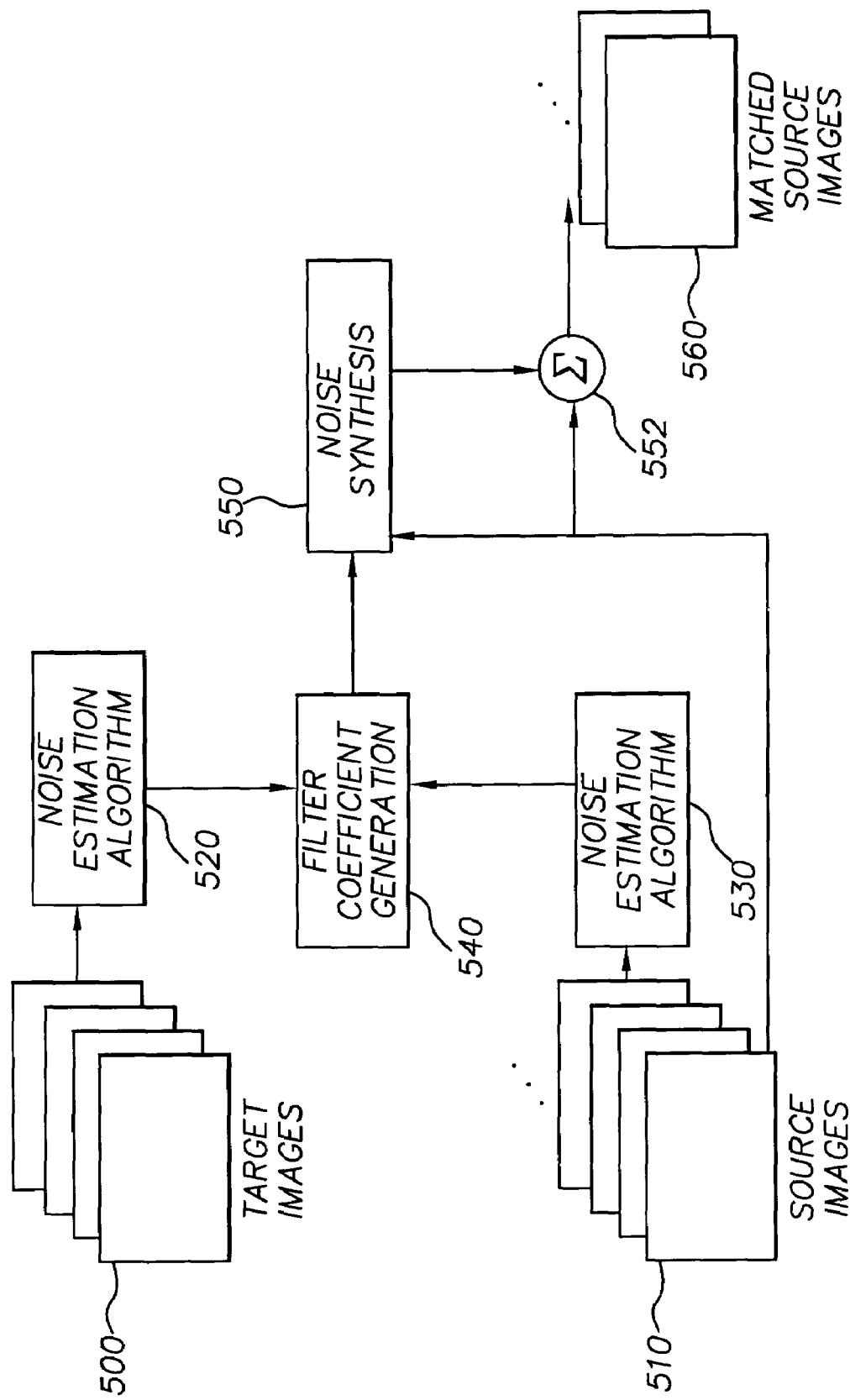
FIG. 6 is a block diagram of an automatic noise-matching algorithm illustrating a technique by which the noise in a source sequence is matched to the noise in a target sequence.

The filtered images from a motion compensated noise filter can have noise added to them to produce matched noise where the matching is done relative to some other sequence of image data. This matching process is shown in FIG. 6. In FIG. 6, target images 500 and source images 510 have their noise estimated by noise estimation algorithms 520 and 530. These noise estimates are used in a filter coefficient generation stage 540 to generate filter coefficients. Grain matching requires slightly different computations because the intrinsic noise present in the source and target image sequences needs to be handled. Eqs. (9) show the model where the subscript "T" denotes "target", "S" denotes "source", and "M" denotes "matching"

$$R_T = R_S + \beta_R R_M$$

$$G_T = G_S + \beta_G G_M + \gamma_G R_M$$

$$B_T = B_S + \beta_B B_M + \gamma_B G_M \qquad \text{Eqs. (9)}$$

This model differs from our previous model since the source material has an intrinsic noise level. As before, we solve the weighting parameters:

$$\beta_R = \sqrt{\frac{\sigma_{R_T}^2 - \sigma_{R_S}^2}{\sigma_{R_M}^2}}$$

$$\gamma_G = \frac{\sigma_{R_T}\sigma_{G_T}\rho_{R_T G_T} - \sigma_{R_S}\sigma_{G_S}\rho_{R_S G_S}}{\beta_R \sigma_{R_M}^2}$$

$$\beta_G = \sqrt{\frac{\sigma_{G_T}^2 - \sigma_{G_S}^2 - \gamma_G^2 \sigma_{R_M}^2}{\sigma_{G_M}^2}}$$

$$\gamma_B = \frac{\sigma_{G_T}\sigma_{B_T}\rho_{G_T B_T} - \sigma_{G_S}\sigma_{B_S}\rho_{G_S B_S}}{\beta_G \sigma_{G_M}^2}$$

$$\beta_B = \sqrt{\frac{\sigma_{B_T}^2 - \sigma_{B_S}^2 - \gamma_B^2 \sigma_{G_M}^2}{\sigma_{B_M}^2}}$$

Eqs. (10)

Then the desired autocorrelation coefficients of the matching signal are:

$$\rho_{R_M}(m,n) = \frac{\sigma_{R_T}^2 \rho_{R_T}(m,n) - \sigma_{R_S}^2 \rho_{R_S}(m,n)}{\sigma_{R_T}^2 - \sigma_{R_S}^2}$$

$$\rho_{G_M}(m,n) = \frac{\sigma_{G_T}^2 \rho_{G_T}(m,n) - \sigma_{G_S}^2 \rho_{G_S}(m,n) - \gamma_G^2 \sigma_{R_M}^2 \rho_{R_M}(m,n)}{\sigma_{G_T}^2 - \sigma_{G_S}^2 - \gamma_G^2 \sigma_{R_M}^2}$$

$$\rho_{B_M}(m,n) = \frac{\sigma_{B_T}^2 \rho_{B_T}(m,n) - \sigma_{B_S}^2 \rho_{B_S}(m,n) - \gamma_B^2 \sigma_{G_M}^2 \rho_{G_M}(m,n)}{\sigma_{B_T}^2 - \sigma_{B_S}^2 - \gamma_B^2 \sigma_{G_M}^2}$$

Eqs. 11

The filter design process follows the exposition given earlier where either a separable or nonseparable filter may be used. With these filter coefficients, noise is synthesized in a noise synthesis stage 550 and added in an adder 552 to the source images resulting in "matched" source images 560 in which the noise position matches that of the target images.

Figure 7:
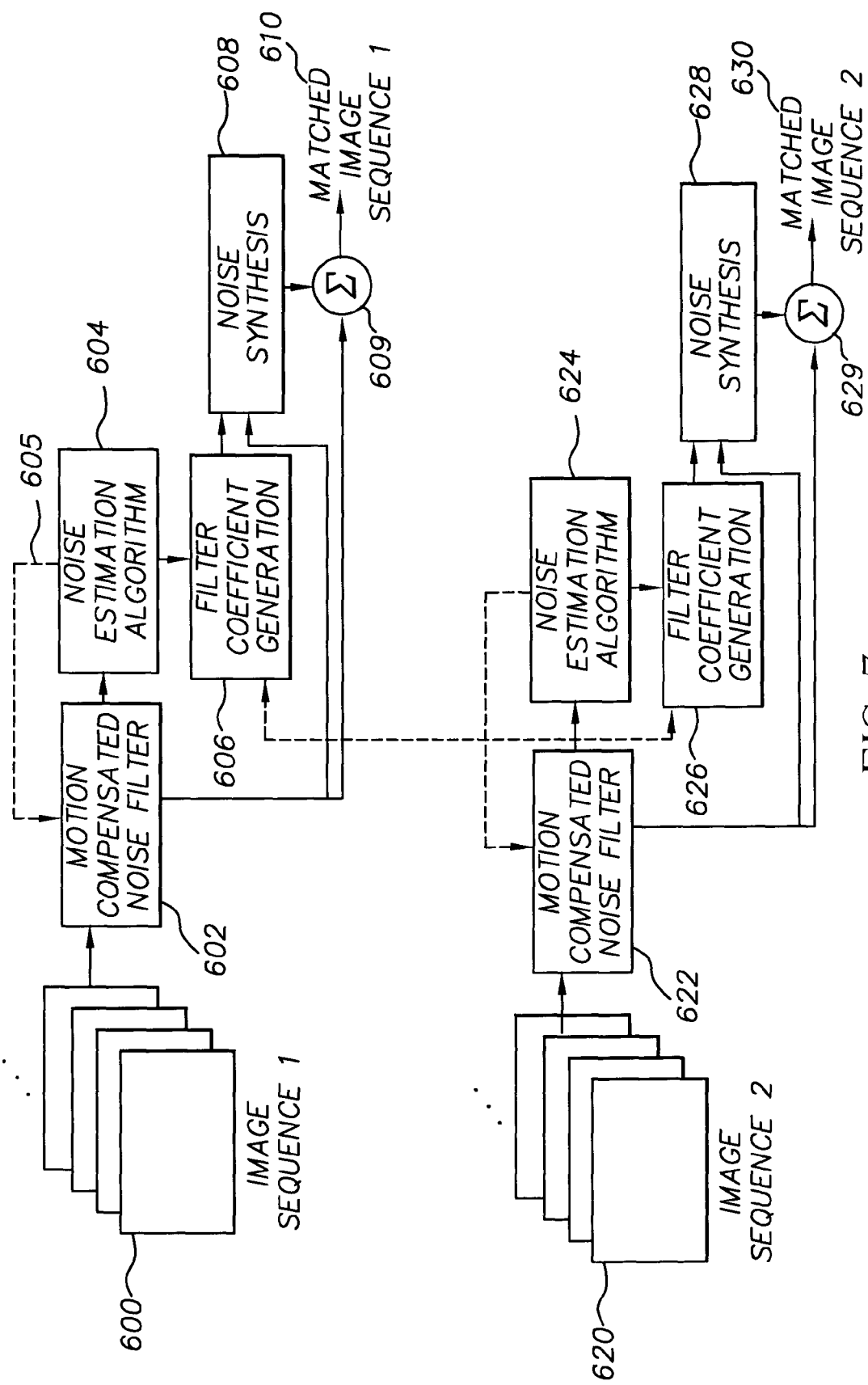
FIG. 7 is a block diagram of an automatic noise matching algorithm employing modification of multiple image sequences, which specifically illustrates a technique by which noise in one sequence is matched to the noise in another sequence by modifying both sequences to achieve a target noise.

This filtering procedure may also be applied to both sequences first to lower the noise position and then different noise may be designed to give both sequences a similar noise position. Each source sequence may have a different source noise level. By choosing a similar target noise level, the matched noise added to each sequence will be different but the final noise positions will be the same. This method is shown in FIG. 7. In FIG. 7, image sequence 600 (sequence 1) is filtered by a motion compensated noise filter 602 and then the noise is estimated by a noise estimation algorithm 604, with this process repeated iteratively (605) as desired. Filter coefficients are created in a filter generation stage 606 and noise is synthesized in a noise synthesis stage 608 and added to the filtered images in a summation stage 609 to produce a matched imaged sequence 610 (sequence 1).

Similarly in FIG. 7, image sequence 620 (sequence 2) is filtered in a motion compensated noise filter 622 and then the noise is estimated by a noise estimation algorithm 624, with this process repeated iteratively (625) as desired. Filter coefficients are created in a filter coefficient generation stage 626 and noise is synthesized in a noise synthesis stage 628 and added to the filtered images to produce a matched imaged sequence 630 (sequence 2) in a summation stage 629. The filter coefficients are tied together because the noise in each sequence is coupled to create the same "noise look" in both sequences. This is the same as the noise matching shown in FIG. 1. Although the source noise level is different in image sequences 1 and 2, by manipulating the filter coefficients in generation stages 606 and 626 to achieve a similar target noise level, the matched noise added to each sequence in summation stages 609 and 629 will be different but the final noise positions of the sequences 1 and 2 will be the same. Thereupon, a conventional compositing operation 80 (FIG. 1) may be performed on the matched sequences. The filter coefficient generation may be done automatically or may include some degree of manual intervention to guide the final look for each image sequence.

The invention has been described in detail with particular reference to certain preferred embodiments thereof, but it will be understood that variations and modifications can be effected within the spirit and scope of the invention.

PARTS LIST 10 motion compensated filter
20 noise estimation algorithm
30 iteration
32 line
34 line
40 adder stage
50 predetermined media "looks"
60 user control system
70 noise matching block
80 composite output
100 random noise field for red channel
102 random noise field for green channel
104 random noise field for blue channel
110 red scaling factor multiplier
112 green scaling factor multiplier
114 blue scaling factor multiplier
120 filter for red channel
122 filter for green channel
124 filter for blue channel
130 red/green inter-channel scaling multiplier
131 adder
132 green/blue inter-channel scaling multiplier
133 adder
140 output red noise
142 output green noise
144 output blue noise
200 input spectral correlations and autocorrelation functions
210 reweighting stage
212 modified autocorrelation functions
220 optimization algorithm
230 filter coefficients
200 input spectral correlations and autocorrelation functions
300 source images 310 motion compensated filtering
320 noise estimation algorithm
330 noise data
332 iteration
400 source images
410 motion compensated filtering
420 spatial mask generation
430 noise estimation algorithm
432 iteration
440 noise data
500 target images
510 source images
520 noise estimation algorithm
530 noise estimation algorithm
540 filter coefficient generation
550 noise synthesis
552 adder
560 matched source images
600 image sequence 1
602 motion compensated noise filtering
604 noise estimation algorithm
605 iteration
606 filter coefficient generation
608 noise synthesis
609 summation stage
610 matched image sequence 1
620 image sequence 2
622 motion compensated noise filtering
624 noise estimation algorithm
625 iteration
626 filter coefficient generation
628 noise synthesis
629 summation stage
630 matched image sequence 2

What is claimed is:

1. A method for synthesizing noise in a digital image comprised of a plurality of color channels, where the noise is used to represent a synthetic texture that visually approximates a predetermined appearance, said method comprising the steps of:
    (a) estimating noise statistics based on a set of spatial autocorrelation coefficients and a set of spectral correlation coefficients that correspond to the color channels, where at least one of the spatial autocorrelation coefficients is weighted by at least one of the spectral correlation coefficients, thereby providing a weighted set of autocorrelation coefficients, and where filter coefficients are obtained from the weighted set of autocorrelation coefficients; and
    (b) synthesizing a synthetic texture by using the filter coefficients to filter a random noise field in each of the color channels, thereby producing output noise fields in each of the color channels that replicate the synthetic texture when combined into the digital image.

2. The method as claimed in claim 1 wherein the step (b) of synthesizing a synthetic texture comprises producing a filtered noise field in each of the channels and weighting at least one of the filtered noise fields with a portion of another filtered noise field to produce at least one of the output noise fields.

3. The method as claimed in claim 1 wherein the noise statistics estimated in step (a) are based on a set of spatial autocorrelation coefficients and a set of spectral correlation coefficients obtained from an arbitrary source.

4. The method as claimed in claim 3 wherein the arbitrary source is obtained from a plurality of predetermined media "looks" or appearances.

5. The method as claimed in claim 3 wherein the arbitrary source is originated from user interaction.

6. The method as claimed in claim 1 wherein the digital image comprises a sequence of digital images and the noise statistics estimated in step (a) are based on a set of spatial autocorrelation coefficients and a set of spectral correlation coefficients obtained from an analysis of the sequence of digital images.

7. The method as claimed in claim 6 wherein the analysis of the sequence of digital images comprises the steps of motion compensated filtering of the sequence of digital images, thereby providing filtered images, and operation on the filtered images with a noise estimation algorithm to provide the noise statistics.

8. The method as claimed in claim 7 further comprising the step of spatially masking the filtered images to identify preferred images areas for noise estimation.

9. The method as claimed in claim 1 wherein the digital image comprises a sequence of source images and another sequence of target images, and wherein the statistics estimated in step (a) are based on a set of spatial autocorrelation coefficients and a set of spectral correlation coefficients obtained from analyzing and matching the source images and the target images.

10. The method as claimed in claim 1 wherein the digital image comprises a first sequence of images and a second sequence of images, each with a different source noise level, and wherein the statistics estimated in step (a) are obtained for each sequence of images by motion filtering of each sequence, thereby providing filtered images in each sequence, and operation on the filtered images in each sequence with a noise estimation algorithm to provide the noise statistics, wherein the noise statistics in each sequence are adjusted to a similar target noise level, whereby the output noise field added to each sequence will be different but the final noise positions of the sequences will be the same.

11. The method as claimed in claim 1 wherein the synthetic texture visually approximates a desired grain appearance.

* * * * *